US012780754B2

(12) United States Patent
Tian et al.

(10) Patent No.: US 12,780,754 B2
(45) Date of Patent: Nov. 3, 2026

(54) PRODUCTION METHOD FOR PREPARING POTASSIUM HUMATE FERTILIZER FROM POTASSIUM FELDSPAR THROUGH CONTINUOUS HIGH-PRESSURE HYDROTHERMAL METHOD

(71) Applicant: China University of Petroleum (East China), Qingdao (CN)

(72) Inventors: Yuanyu Tian, Qingdao (CN); Yiliang Tian, Qingdao (CN); Yingyun Qiao, Qingdao (CN); Zhaoyue Sun, Qingdao (CN); Jingxian Wang, Qingdao (CN); Yingshuo Wang, Qingdao (CN); Xinjian Qiao, Qingdao (CN); Peijie Zong, Qingdao (CN); Yanpeng Zhang, Qingdao (CN); Ruotong Cui, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 19/421,807

(22) Filed: Dec. 16, 2025

(65) Prior Publication Data

US 2026/0167579 A1 Jun. 18, 2026

(30) Foreign Application Priority Data

Dec. 17, 2024 (CN) ........................ 202411865515.8

(51) Int. Cl.
*C05D 1/04* (2006.01)
*C05D 3/04* (2006.01)
(Continued)

(52) U.S. Cl.
CPC ................ *C05D 1/04* (2013.01); *C05D 3/04* (2013.01); *C05G 3/40* (2020.02); *C05G 5/12* (2020.02); *C05G 5/30* (2020.02)

(58) Field of Classification Search
CPC ... C02D 1/04; C02D 3/04; C05G 3/40; C05G 5/12; C05G 5/30
See application file for complete search history.

(56) References Cited

FOREIGN PATENT DOCUMENTS

| | | |
|---|---|---|
| CN | 1365958 A | 8/2002 |
| CN | 1508092 A | 6/2004 |

(Continued)

OTHER PUBLICATIONS

The State Intellectual Property Office of People's Republic of China. First Office Action. Application No. 202411865515.8 Jun. 12, 2025 (Year: 2025).*

*Primary Examiner* — Jennifer A Smith
(74) *Attorney, Agent, or Firm* — Calfee, Halter & Griswold LLP

(57) ABSTRACT

The disclosure relates to a method for preparing potassium humate fertilizer through continuous high-pressure hydrothermal reaction of potassium feldspar. The method comprises: wet grinding slurrying, hydrothermal reaction, flash evaporation filter pressing, humic acid modified potassium fertilizer preparation, and causticization and humic acid modified silicon-calcium fertilizer preparation. High-pressure tubular hydrothermal and tower-type delayed reactions on potassium feldspar slurry produce potassium aluminosilicate and potassium silicate. Alkaline potassium aluminosilicate filter residues are mixed with humic acid, modified, granulated, and dried to obtain humic acid coated slow-release potassium fertilizer. The alkaline potassium silicate filtrate and lime undergo causticization to obtain KOH solution, which is recycled to the wet grinding process. Alkaline calcium silicate and humic acid are mixed, modi- (Continued)

fied, granulated, and dried to produce humic acid coated slow-release silicon-calcium fertilizer.

6 Claims, 1 Drawing Sheet

(51) Int. Cl.
*C05G 3/40* (2020.01)
*C05G 5/12* (2020.01)
*C05G 5/30* (2020.01)

(56) References Cited

FOREIGN PATENT DOCUMENTS

| | | | |
|---|---|---|---|
| CN | 101450874 | A | 6/2009 |
| CN | 101921141 | A | 12/2010 |
| CN | 104326492 | A | 2/2015 |
| CN | 104609909 | A | 5/2015 |
| CN | 105621426 | A | 6/2016 |
| CN | 108238832 | A | 7/2018 |
| CN | 110330975 | A | 10/2019 |

* cited by examiner

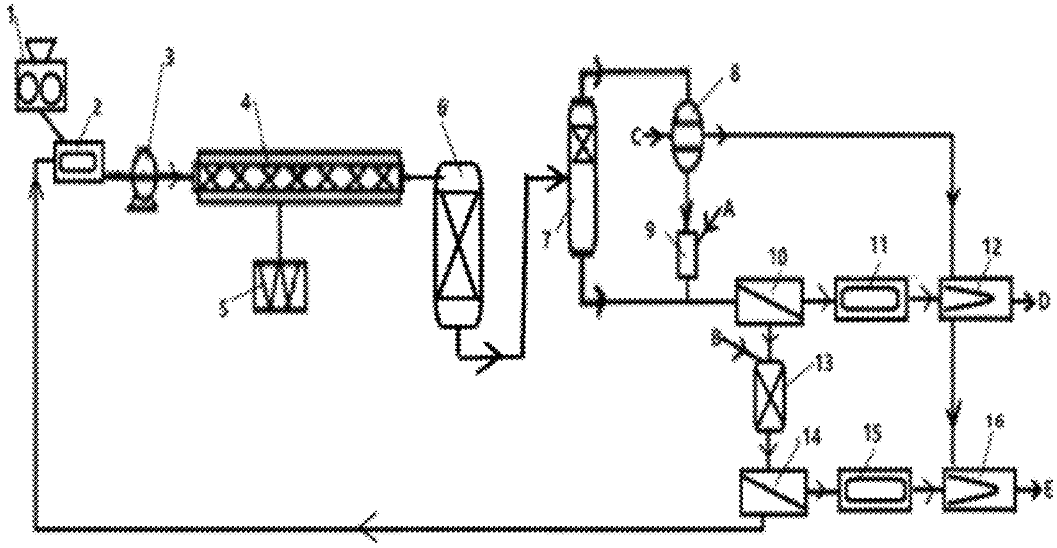
1
2
3
4
5
6
7
8
9
10
11
12
13
14
15
16
A
B
C
D
E

PRODUCTION METHOD FOR PREPARING POTASSIUM HUMATE FERTILIZER FROM POTASSIUM FELDSPAR THROUGH CONTINUOUS HIGH-PRESSURE HYDROTHERMAL METHOD

CROSS-REFERENCE TO RELATED APPLICATIONS

The application claims priority to Chinese Application No. 202411865515.8, filed on Dec. 17, 2024, the content of which is specifically and entirely incorporated herein by reference.

FIELD

The present disclosure relates to the technical field of fine chemicals, in particular to a production method for preparing a potassium humate fertilizer utilizing through continuous high-pressure hydrothermal reaction of potassium feldspar.

BACKGROUND

Potassium is one of the three essential nutrients for crop growth, it can enhance the resistance of crops to drought, cold, disease, salt and lodging, and has a significant effect on stable and high yields of crops. Therefore, almost every crop needs to be applied with an appropriate amount of potassium fertilizer. There is a huge demand gap for potassium fertilizer, and the water-soluble potassium salt resources used as potassium fertilizer is extremely scarce. Conversely, the insoluble potassium ore resources are extremely abundant, with the characteristics of wide distribution, high quality, and easy exploitation. Among them, potassium feldspar is the most representative potassium ore resource. Since potassium feldspar has a three-dimensional framework structure formed by Si—Al—O tetrahedrons, its chemical properties are extremely stable and can hardly be decomposed by other acids and alkalis except concentrated sulfuric acid and hydrofluoric acid at room temperature and under normal pressure. Therefore, the key to extracting potassium salts is to efficiently decompose potassium feldspar and convert the water-insoluble potassium into water-soluble potassium compounds.

There are more than ten process methods for producing potassium fertilizer using potassium feldspar in China and foreign countries, namely low-temperature decomposition process, hydrothermal decomposition process, microbial decomposition process, molten salt ion exchange process, roasting process, blast furnace smelting process, high-temperature melting process, and microwave radiation process, etc. However, each of the processes has some defects in terms of technology and economy, such as single product variety, excessive energy consumption, serious environmental pollution, excessively complicated production process, large amount of tailings residue, too strong alkalinity of potassium fertilizer, insufficient full-resource utilization. So far, there has been no large-scale industrial production. It is urgent to develop the production method and equipment of large-scale continuous high-pressure hydrothermal reaction of potassium feldspar for producing universal modified potassium fertilizer, as to solve the problem of full resource utilization of potassium feldspar resources.

SUMMARY

The present disclosure aims to overcome the defects of the prior art with respect to preparation of potassium fertilizer with potassium feldspar, and provides a production method for preparing a potassium humate fertilizer through continuous high-pressure hydrothermal reaction of potassium feldspar. Preparing an alkaline ore slurry by wet grinding a KOH solution and potassium feldspar, and subjecting the alkaline ore slurry to an enhanced hydrothermal reaction in an electromagnetic heating tubular reactor and a tower-type delayed reactor, then subjecting the hydrothermal reaction slurry to flash separation, and then performing steam heat recovery and slurry dilution flocculation and pressure filtration; mixing the filter residue with a humic acid, modifying and granulating the mixture to obtain a long-acting slow-release potassium fertilizer, performing a causticization reaction of the filtrate and lime to obtain a KOH solution and calcium silicate, returning the KOH solution to the wet grinding slurrying process; mixing the calcium silicate and a humic acid, modifying and granulating the mixture to produce a long-acting slow-release silicon-calcium fertilizer product, thereby solving the defects of the original potassium feldspar hydrothermal method for preparing potassium fertilizer, such as low potassium extraction rate, too strong alkalinity of potassium fertilizer products, excessive energy consumption, serious environmental pollution, and failure to effectively utilize tailings and residues, and realizing large-scale, clean, efficient and full-resource fertilizer utilization of potassium feldspar resources.

To solve the above-mentioned technical problems, the present disclosure provides a production method for preparing a potassium humate fertilizer through continuous high-pressure hydrothermal reaction of potassium feldspar, the production method comprises the following steps:

(1) A wet grinding slurrying process: initially adding a KOH solution and crushed potassium feldspar according to a weight ratio of (1.5-5):1 into a wet mill and subjecting to a fine grinding to obtain an alkaline ore slurry, the KOH solution has a concentration within the range of 25 wt %-45 wt %, and the slurrying temperature is lower than 80° C.;

(2) A hydrothermal reaction process: pressurizing the alkaline ore slurry obtained from step (1) by a high pressure pump and feeding into an electromagnetic heating tubular reactor to carry out a hydrothermal reaction, wherein the flow rate in tube is within the range of 1-5 m/s, the reaction temperature is within the range of 200-350° C., the pressure is the saturation pressure at the reaction temperature, the reaction time is within the range of 1-900 seconds; then feeding the alkaline ore pulp into a tower-type delayed reactor to extend the reaction time by 30-240 minutes and further enhance the hydrothermal reaction, a hydrothermal reaction slurry with an extraction rate of potassium within the range of 95%-99.9% is obtained from the tower-type delayed reactor bottom;

(3) A flash evaporation filter pressing process: introducing the hydrothermal reaction slurry into a flash tower to carry out a flash evaporation separation, wherein a pressure of the flash tower top is from atmospheric pressure to 30 KPa, the high temperature steam obtained from the tower top preheats air to provide a cooling water, diluting the slurry at the tower bottom with the cooling water and subjecting the slurry to a filter pressing to obtain an alkaline potassium aluminosilicate filter residue and a potassium silicate filtrate;

(4) A humic acid modified potassium fertilizer preparation process: mixing the alkaline potassium aluminosilicate filter residue with a humic acid according to a weight ratio of 1: (0.1-0.3), then modifying and granulating the mixture to produce a neutral long-acting slow-release potassium fertilizer, subsequently heating and drying the long-acting slow-release potassium fertilizer with hot air to obtain a humic acid coated long-acting slow-release potassium fertilizer product;

Alternatively, reacting the alkaline potassium aluminosilicate filter residue with a biologic fulvic acid to generate a water-soluble potassium fulvate;

(5) A causticization and humic acid modified silicon-calcium fertilizer preparation process: blending the alkaline potassium silicate filtrate with lime according to a potassium and calcium molar ratio of 2: (1-1.2) to carry out a causticization reaction, returning the obtained KOH solution to the wet grinding slurrying process for recycling; mixing the obtained alkaline calcium silicate with a humic acid according to a weight ratio of 1: (0.1-0.3), modifying and granulating the mixture to produce a neutral long-lasting slow-release silicon-calcium fertilizer, subsequently heating and drying the long-lasting slow-release silicon-calcium fertilizer with hot air to prepare a humic acid coated long-acting slow-release silicon-calcium fertilizer product.

Preferably, the electromagnetic heating tubular reactor is a tubular reactor operated under the action of an electromagnetic heating regulator, when a high-frequency alternating current generates an alternating magnetic field through coils, the tubular reactor wall and its internal self-mixing enhancing internal component generate an eddy current for self-heating, thereby achieving uniform heating, rapid temperature rise and hydrothermal reaction of the high-pressure alkaline ore slurry, wherein the self-mixing enhancing internal components may have a regular packing type, an X-cross sheet type, or a spiral sheet type.

Preferably, the tower-type delayed reactor has a height-to-diameter ratio of (3-30):1, and contains a filler component, a grid self-mixing component or an empty tower inside.

Preferably, the flash tower is set to 1-6 stages, and the heat exchanger for flash distillation high-temperature steam cooling is a fire tube heat exchanger for easy blockage clearance.

Preferably, the humic acid used for the humic acid coated long-acting slow-release potassium fertilizer and the humic acid coated long-acting slow-release silicon-calcium fertilizer is one of a biological humic acid, a mineral resource humic acid, a molasses waste liquid, or a monosodium glutamate waste liquid concentrate, or a mixture thereof.

Preferably, the potassium aluminosilicate filter residue is reacted with the biological fulvic acid according to the carboxyl to potassium molar ratio of (1-3):1 at a temperature of 15-90° C. to generate a water-soluble potassium fulvate and an insoluble aluminum silicate.

BRIEF DESCRIPTION OF THE DRAWINGS

FIG. 1 illustrates a schematic diagram of the present disclosure.

DESCRIPTION OF REFERENCE SIGNS

1. Crusher
2. Wet mill
3. High pressure pump
4. Electromagnetic heating tubular reactor
5. Electromagnetic heating regulator
6. Tower-type delayed reactor
7. Flash tower
8. Heat exchanger
9. Flocculation charging tank
10. First filter press
11. First mixing modifying granulator
12. First dryer
13. Causticization reactor
14. Second filter press
15. Second mixing modifying granulator
16. Second dryer
A. Flocculant inlet
B. Lime inlet
C. Cold air inlet
D. Humic acid coated long-acting slow-release potassium fertilizer product
E. Humic acid coated long-acting slow-release silicon-calcium fertilizer product

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The present disclosure provides a production method for preparing a potassium humate fertilizer through continuous high-pressure hydrothermal reaction of potassium feldspar, the production method comprises the following steps:

(1) A wet grinding slurrying process: initially adding a KOH solution and crushed potassium feldspar according to a weight ratio of (1.5-5):1 into a wet mill and subjecting to a fine grinding to obtain an alkaline ore slurry, the KOH solution has a concentration within the range of 25 wt %-45 wt %, and the slurrying temperature is lower than 80° C.;

(2) A hydrothermal reaction process: pressurizing the alkaline ore slurry obtained from step (1) by a high pressure pump and feeding into an electromagnetic heating tubular reactor to carry out a hydrothermal reaction, wherein the flow rate in tube is within the range of 1-5 m/s, the reaction temperature is within the range of 200-350° C., the pressure is the saturation pressure at the reaction temperature, the reaction time is within the range of 1-900 seconds; then feeding the alkaline ore slurry into a tower-type delayed reactor to extend the reaction time by 30-240 minutes and further enhance the hydrothermal reaction, a hydrothermal reaction slurry with an extraction rate of potassium-containing compound within the range of 95%-99.9% is obtained from the tower-type delayed reactor bottom;

(3) A flash evaporation filter pressing process: introducing the hydrothermal reaction slurry into a flash tower to carry out a flash separation, wherein a pressure of the flash tower top is from atmospheric pressure to 30 KPa, the high temperature steam obtained from the tower top preheats air to provide a cooling water, diluting the slurry at the tower bottom with the cooling water and subjecting the slurry to a filter pressing to obtain an alkaline potassium aluminosilicate filter residue and a potassium silicate filtrate;

(4) A humic acid modified potassium fertilizer preparation process: mixing the alkaline potassium aluminosilicate filter residue with a humic acid according to a weight ratio of 1: (0.1-0.3), then modifying and granulating the mixture to produce a neutral long-acting slow-release potassium fertilizer, subsequently heating and drying the long-acting slow-release potassium fertilizer with hot air to obtain a humic acid coated long-acting slow-release potassium fertilizer product;

Alternatively, reacting the alkaline potassium aluminosilicate filter residue with a biologic fulvic acid to generate a water-soluble potassium fulvate;

(5) A causticization and humic acid modified silicon-calcium fertilizer preparation process: blending the alkaline potassium silicate filtrate with lime according to a potassium and calcium molar ratio of 2: (1-1.2) to carry out a causticization reaction, returning the obtained KOH solution to the wet grinding slurrying process for recycling; mixing the obtained alkaline calcium silicate with a humic acid according to a weight ratio of 1: (0.1-0.3), modifying and granulating the mixture to produce a neutral long-lasting slow-release silicon-calcium fertilizer, subsequently heating and drying the long-lasting slow-release silicon-calcium fertilizer with hot air to prepare a humic acid coated long-acting slow-release silicon-calcium fertilizer product.

In the present disclosure, the crushed potassium feldspar may be a product of the potassium feldspar shattered by a crusher, preferably, the average particle size of the crushed potassium feldspar is within the range from 100 μm to 500 mm.

In the present disclosure, the weight ratio of KOH solution to crushed potassium feldspar is (1.5-5):1, preferably 1.5:1, 2:1, 3:1, 4:1, 5:1, and other specific weight ratios, or a random value within the range consisting of any two thereof, preferably, the weight ratio of KOH solution to crushed potassium feldspar is (2-4):1.

In the present disclosure, the KOH solution has a concentration within the range of 25 wt %-45 wt %, for example, the concentration may be 25 wt %, 30 wt %, 35 wt %, 40 wt %, 45 wt %, and other specific concentration values, or a random value within the range consisting of any two thereof, preferably, the KOH solution has a concentration within the range of 25 wt %-35 wt %.

In the present disclosure, the hydrothermal reaction process of step (2) comprises: initially carrying out a hydrothermal reaction an electromagnetic heating tubular reactor, wherein the flow rate in tube is within the range of 1-5 m/s, preferably within the range of 2-3 m/s, the reaction temperature is within the range of 200-350° C., preferably within the range of 250-330° C., the pressure is the saturation pressure at the reaction temperature, the reaction time is within the range of 1-900 seconds, preferably within the range of 3-20 seconds.

Preferably, the electromagnetic heating tubular reactor is a tubular reactor operated under the action of an electromagnetic heating regulator 5, when a high-frequency alternating current generates an alternating magnetic field through coils, the tubular reactor wall and its internal self-mixing enhancing internal component generate an eddy current for self-heating, thereby achieving uniform heating, rapid temperature rise and hydrothermal reaction of the high-pressure alkaline ore slurry, wherein the self-mixing enhancing internal components may have a regular packing type, an X-cross sheet type, or a spiral sheet type.

In the present disclosure, a hydrothermal reaction slurry with an extraction rate of potassium within the range of 95%-99.9%, preferably within the range of 95%-96% is obtained from the tower-type delayed reactor bottom.

In the present disclosure, the extraction rate of potassium is calculated with the following method:

The extraction rate of potassium=(potassium content in the potassium aluminosilicate×potassium aluminosilicate yield+potassium content in the potassium silicate×potassium silicate yield−potassium content in the consumed potassium hydroxide)/potassium content in the potassium feldspar×100%.

Preferably, the tower-type delayed reactor 6 has a height-to-diameter ratio of (3-30): 1, such as 3:1, 4:1, 5:1, 10:1, 15:1, 20:1, 25:1, 30:1, or a specific height-to-diameter ratio, or a random value within the range consisting of any two thereof. The tower-type delayed reactor may contain a filler component, a grid self-mixing component or an empty tower inside.

The flash tower 7 is set to 1-6 stages, for example, it may be 1 stage, 2 stages, 3 stages, 4 stages, 5 stages, 6 stages. The heat exchanger 8 for flash distillation high-temperature steam cooling is a fire tube heat exchanger that is convenient to remove blocking.

In the present disclosure, the alkaline calcium silicate is mixed with a humic acid according to a weight ratio of 1: (0.1-0.3), the weight ratio may be 1:0.1, 1:0.15, 1:0.2, 1:0.25, 1:0.3, or a random value within the range consisting of any two thereof.

Preferably, the humic acid used for the humic acid coated long-acting slow-release potassium fertilizer and the humic acid coated long-acting slow-release silicon-calcium fertilizer is one of a biological humic acid, a mineral humic acid, a molasses waste liquid, or a monosodium glutamate waste liquid concentrate, or a mixture thereof.

The biological humic acid includes a biological fulvic acid and/or a biological brownish black humic acid.

In the present disclosure, the humic acid modified potassium fertilizer preparation process in step (4) may comprise: mixing the alkaline potassium aluminosilicate filter residue with a humic acid, then modifying and granulating the mixture to produce a neutral long-acting slow-release potassium fertilizer, subsequently heating and drying the long-acting slow-release potassium fertilizer with hot air to obtain a humic acid coated long-acting slow-release potassium fertilizer product; or reacting the alkaline potassium aluminosilicate filter residue with a biologic fulvic acid to generate a water-soluble potassium fulvate.

Preferably, the potassium aluminosilicate filter residue is reacted with the biological fulvic acid according to the carboxyl to potassium molar ratio of (1-3):1 at a temperature of 15-90° C. to generate a water-soluble potassium fulvate and an insoluble aluminum silicate.

According to some preferred embodiments of the present disclosure, the method is performed in a system as shown in FIG. 1, the method comprises the following steps:

(1) A wet grinding slurrying process: adding a potassium feldspar crushed by crusher 1 and a KOH solution according to a weight ratio of 1:(1.5-5) into a wet mill 2 and subjecting to a fine grinding to obtain an alkaline ore slurry, the KOH solution has a concentration within the range of 25 wt %-45 wt %, and the slurrying temperature is lower than 80° C.;

(2) A hydrothermal reaction process: pressurizing the alkaline ore slurry obtained from step (1) by a high pressure pump 3 and feeding into an electromagnetic heating tubular reactor 4, the tubular reactor wall and its internal self-mixing enhancing internal component generate an eddy current under the action of an electromagnetic heating regulator 5 for performing the uniform heating and hydrothermal reaction, wherein the flow rate in tube is within the range of 1-5 m/s, the reaction temperature is within the range of 200-350° C., the pressure is the saturation pressure at the reaction temperature, the reaction time is within the range of 1-900 seconds; then feeding the alkaline ore slurry into a tower-type delayed reactor 6 to extend the reaction time by 30-240 minutes and further enhance the hydrothermal reaction, a hydrothermal reaction slurry with an extraction rate of potassium within the range of 95%-99.9% is obtained from the bottom of said tower-type delayed reactor 6;

(3) A flash evaporation filter pressing process: introducing the hydrothermal reaction slurry into a flash tower 7 to carry out a flash separation, wherein a tower top pressure of the flash tower 7 is from atmospheric pressure to 30 KPa, the high temperature steam obtained from the tower top preheats air by a heat exchanger 8 to provide a cooling water, a flocculation charging tank 9 is provided with a flocculant inlet A, the cooling water passes through the flocculation charging tank 9 and added into the slurry obtained from the tower bottom for dilution and flocculation, then subjecting the slurry to a filter pressing by a first filter press 10 to obtain an alkaline potassium aluminosilicate filter residue and a potassium silicate filtrate;

(4) A humic acid modified potassium fertilizer preparation process: mixing the alkaline potassium aluminosilicate filter residue with a humic acid according to a weight ratio of 1:(0.1-0.3), then modifying and granulating the mixture in a first mixing modifying granulator 11, subsequently heating and drying the humic acid coated potassium aluminosilicate with hot air in a first dryer 12 to obtain a neutral humic acid coated long-acting slow-release potassium fertilizer product D;

(5) A causticization and humic acid modified silicon-calcium fertilizer preparation process: a causticization reactor 13 is equipped with a lime inlet B, blending the alkaline potassium silicate filtrate with lime in the causticization reactor 13 according to a potassium and calcium molar ratio of 2: (1-1.2) to carry out a causticization reaction, returning the KOH solution obtained from a second filter press 14 to the wet grinding slurrying process for recycling; mixing the alkaline calcium silicate with a humic acid according to a weight ratio of 1:(0.1-0.3), and modifying and granulating the mixture in a second mixing modifying granulator 15, subsequently heating and drying a humic acid coated calcium silicate with hot air to prepare a neutral humic acid coated long-acting slow-release silicon-calcium fertilizer product E.

The present disclosure will be described in detail below with reference to examples.

The contents of potassium and silicon in the product were measured by the X-Ray Diffraction (XRD) method.

Example 1

(1) A KOH solution having a concentration of 30 wt % was mixed with potassium feldspar having a particle size less than 6 mm and a potassium content of 13% according to a weight ratio of 3:1 at a temperature of 45° C., the mixture was subjected to a wet method fine grinding to obtain an alkali ore slurry with a granularity less than or equal to 60 μm;

(2) The alkali ore slurry was subjected to a hydrothermal reaction in an electromagnetic heating tubular reactor at a flow rate of 2 m/s and a temperature of 280° C. for 10 seconds, and then subjected to an extended reaction in a tower-type delayed reactor for 50 minutes, a hydrothermal reaction slurry with an extraction rate of potassium of 98% was obtained.

(3) The hydrothermal reaction slurry was subjected to a flash separation in a two-stage flash tower (the tower top pressure of the flash tower was 30 KPa), the steam performed a heat exchange with air, the slurry was diluted and filtered, the potassium silicate filtrate was mixed with lime according to a potassium and calcium molar ratio of 2:1.05 and subjected to the causticization reaction and then filtered; the obtained potassium aluminosilicate and calcium silicate were separately added with 10% of a biological brownish black humic acid, then subjected to mixing, modifying, granulating and drying, to obtain a humic acid coated long-acting slow-release potassium fertilizer product with a potassium content of 28% and a silicon content of 22%, and a humic acid coated long-acting slow-release silicon-calcium fertilizer product with a silicon content of 24% respectively; the KOH solution was recycled, it was required to supplement 10% of KOH.

Example 2

(1) A KOH solution having a concentration of 35 wt % was mixed with potassium feldspar having a particle size less than 6 mm and a potassium content of 13% according to a weight ratio of 2.5:1 at a temperature of 60° C., the mixture was subjected to a wet method fine grinding to obtain an alkali ore slurry with a granularity less than or equal to 74 μm;

(2) The alkali ore slurry was subjected to a hydrothermal reaction in an electromagnetic heating tubular reactor at a flow rate of 3 m/s and a temperature of 290° C. for 7 seconds, and then subjected to an extended reaction in a tower-type delayed reactor for 60 minutes, a hydrothermal reaction slurry with an extraction rate of potassium of 99.5% was obtained.

(3) The hydrothermal reaction slurry was subjected to a flash separation in a two-stage flash tower (the tower top pressure of the flash tower was 10 KPa), the steam performed a heat exchange with air, the slurry was diluted and filtered, the potassium silicate filtrate was mixed with lime according to a potassium and calcium molar ratio of 2:1.1 and subjected to the causticization reaction and then filtered; the obtained potassium aluminosilicate and calcium silicate were separately added with 15% of a mineral brownish black humic acid, then subjected to mixing, modifying, granulating and drying, to obtain a humic acid coated long-acting slow-release potassium fertilizer product with a potassium content of 27% and a silicon content of 20%, and a humic acid coated long-acting slow-release silicon-calcium fertilizer product with a silicon content of 24.2% respectively; the KOH solution was recycled, it was required to supplement 9% of KOH.

Example 3

(1) A KOH solution having a concentration of 35 wt % was mixed with potassium feldspar having a particle size less than 6 mm and a potassium content of 13% according to a weight ratio of 2.5:1 at a temperature of 60° C., the mixture was subjected to a wet method fine grinding to obtain an alkali ore slurry with a granularity less than or equal to 74 μm;

(2) The alkali ore slurry was subjected to a hydrothermal reaction in an electromagnetic heating tubular reactor at a flow rate of 3 m/s and a temperature of 290° C. for 7 seconds, and then subjected to an extended reaction in a tower-type delayed reactor for 60 minutes, a hydrothermal reaction slurry with an extraction rate of potassium of 99.5% was obtained.

(3) The hydrothermal reaction slurry was subjected to a flash separation in a two-stage flash tower (the tower top pressure of the flash tower was atmospheric pressure), the steam performed a heat exchange with air, the slurry was diluted and filtered, the potassium silicate filtrate was mixed with lime according to a potassium and calcium molar ratio of 2:1.08 and subjected to the causticization reaction and then filtered; the obtained calcium silicate was added with 15% of a biological brownish black humic acid, then subjected to mixing, modifying, granulating and drying, to obtain a humic acid coated long-acting slow-release silicon-calcium fertilizer product with a silicon content of 24.2%; a KOH solution was recycled, it was required to supplement 9% of KOH; the obtained potassium aluminosilicate was reacted with a biological fulvic acid according to the carboxyl to potassium molar ratio of 2:1 at a temperature of 65° C. to produce a potassium fulvate solution and an insoluble aluminum silicate precipitate, the potassium fulvate solution was dried to obtain a potassium potassium fulvate product containing 30% of potassium oxide.

The present disclosure provides a production method for preparing a potassium humate fertilizer through continuous high-pressure hydrothermal reaction of potassium feldspar, wherein the crushed potassium feldspar is subjected to in-situ wet grinding and activation by a KOH solution, a high-pressure hydrothermal desilication in an electromagnetic heating tubular reactor, and an enhanced hydrothermal desilication in a tower-type delayed reactor, and then subjected to a flash separation, the separated steam heats air for drying the product, the alkali-hydrated and desilicated potassium fertilizer and silicon-calcium fertilizer are subjected to neutralization, modifying and granulating by a humic acid to produce a universal long-acting slow-release fertilizer, the potassium extraction rate is increased from 85% of the existing potassium feldspar hydrothermal process for preparing potassium fertilizer to 99% or more, the potassium fertilizer product pH is decreased from 13 to 6-8, the electromagnetic heating energy consumption is reduced by 30%, and there is no contamination of dust and waste water, thereby achieving the large-scale, clean, efficient full-resource fertilizer utilization of the potassium feldspar resources.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A production method for preparing a potassium humate fertilizer through continuous high-pressure hydrothermal reaction of potassium feldspar, the production method comprises the following steps:

(1) a wet grinding slurrying process: initially adding a KOH solution and crushed potassium feldspar according to a weight ratio of (1.5-5): 1 into a wet mill and subjecting to a fine grinding to obtain an alkaline ore slurry, the KOH solution has a concentration within the range of 25 wt %-45 wt %, and the slurrying temperature is lower than 80° C.;

(2) a hydrothermal reaction process: pressurizing the alkaline ore slurry obtained from step (1) by a high pressure pump and feeding into an electromagnetic heating tubular reactor to carry out a hydrothermal reaction, wherein a flow rate in the electromagnetic heating tubular reactor is within the range of 1-5 m/s, the reaction temperature is within the range of 200-350° C., the pressure is the saturation pressure at the reaction temperature, the reaction time is within the range of 1-900 seconds; then feeding the alkaline ore slurry into a tower-type delayed reactor to extend the reaction time by 30-240 minutes and further enhance the hydrothermal reaction, a hydrothermal reaction slurry with an extraction rate of potassium within the range of 95%-99.9% is obtained from the tower-type delayed reactor bottom;

(3) a flash evaporation filter pressing process: introducing the hydrothermal reaction slurry into a flash tower to carry out a flash separation, wherein a pressure of the flash tower top is from atmospheric pressure to 30 KPa, the high temperature steam obtained from the tower top preheats air and condenses to provide a cooling water, diluting the slurry at the tower bottom with the cooling water and subjecting the slurry to a filter pressing to obtain an alkaline potassium aluminosilicate filter residue and a potassium silicate filtrate;

(4) a humic acid modified potassium fertilizer preparation process, or alternatively, a water-soluble potassium fulvate preparation process:

mixing the alkaline potassium aluminosilicate filter residue with a humic acid according to a weight ratio of 1: (0.1-0.3), then modifying and granulating the mixture to produce a neutral long-acting slow-release potassium fertilizer, subsequently heating and drying the long-acting slow-release potassium fertilizer with hot air to obtain a humic acid coated long-acting slow-release potassium fertilizer product;

or alternatively, reacting the alkaline potassium aluminosilicate filter residue with a biologic fulvic acid to generate a water-soluble potassium fulvate;

(5) a causticization and humic acid modified silicon-calcium fertilizer preparation process:

blending the alkaline potassium silicate filtrate with lime according to a potassium and calcium molar ratio of 2: (1-1.2) to carry out a causticization reaction, returning the obtained KOH solution to the wet grinding slurrying process for recycling; mixing the obtained alkaline calcium silicate with a humic acid according to a weight ratio of 1: (0.1-0.3), modifying and granulating the mixture to produce a neutral long-lasting slow-release silicon-calcium fertilizer, subsequently heating and drying the long-lasting slow-release silicon-calcium fertilizer with hot air to prepare a humic acid coated long-acting slow-release silicon-calcium fertilizer product.

2. The production method for preparing a potassium humate fertilizer through continuous high-pressure hydrothermal reaction of potassium feldspar according to claim 1, wherein the electromagnetic heating tubular reactor is operated under the action of an electromagnetic heating regulator, the tubular reactor wall and an internal self-mixing enhancing internal component of the tubular reactor generate an eddy current for self-heating when a high-frequency alternating current generates an alternating magnetic field through coils of the tubular reactor, wherein the internal self-mixing enhancing internal component has a regular packing type, an X-cross sheet type, or a spiral sheet type.

3. The production method for preparing a potassium humate fertilizer through continuous high-pressure hydrothermal reaction of potassium feldspar according to claim 1, wherein the tower-type delayed reactor has a height-to-diameter ratio of (3-30): 1, and contains a filler component, a grid self-mixing component or an empty tower inside.

4. The production method for preparing a potassium humate fertilizer through continuous high-pressure hydrothermal reaction of potassium feldspar according to claim 1, wherein the flash tower is set to 1-6 stages, and a heat exchanger for exchanging heat between the high temperature steam and air is a fire tube heat exchanger.

5. The production method for preparing a potassium humate fertilizer through continuous high-pressure hydrothermal reaction of potassium feldspar according to claim 1, wherein the humic acid used for the humic acid coated long-acting slow-release potassium fertilizer and the humic acid coated long-acting slow-release silicon-calcium fertilizer is one of a biological humic acid, a mineral humic acid, a molasses waste liquid, or a monosodium glutamate waste liquid concentrate, or a mixture thereof.

6. The production method for preparing a potassium humate fertilizer through continuous high-pressure hydrothermal reaction of potassium feldspar according to claim 1, wherein the potassium aluminosilicate filter residue is reacted with the biologic fulvic acid according to the carboxyl to potassium molar ratio of (1-3): 1 at a temperature of 15-90° C. to generate a water-soluble potassium fulvate and an insoluble aluminum silicate.

* * * * *